2 Sheets—Sheet 1.
E. PRICE.
Milk Cooler.
No. 229,180. Patented June 22, 1880.
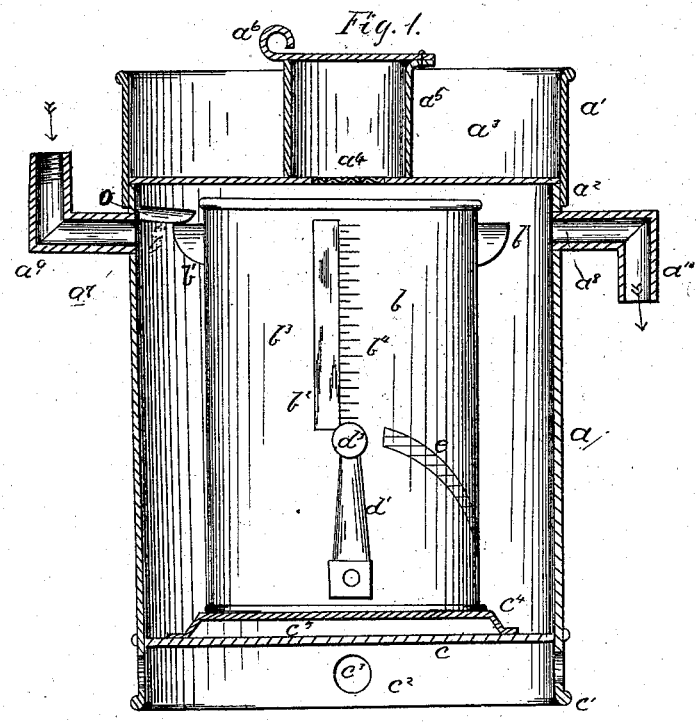
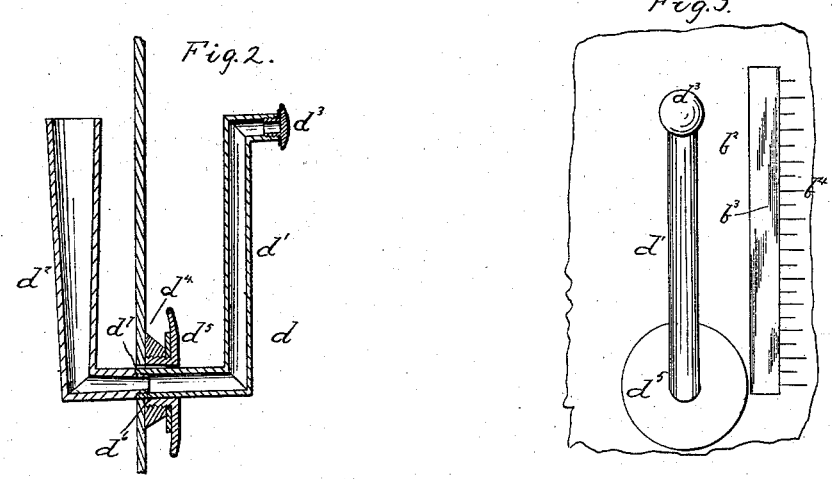
WITNESSES
P. B. Turkin
F. D. Thomason
INVENTOR
Edward Price
By R. S. & A. Lacey
ATTORNEYS.
N. PETERS, PHOTO-LITHOGRAPHER, WASHINGTON, D.C.

2 Sheets—Sheet 2.
E. PRICE.
Milk Cooler.
No. 229,180. Patented June 22, 1880.
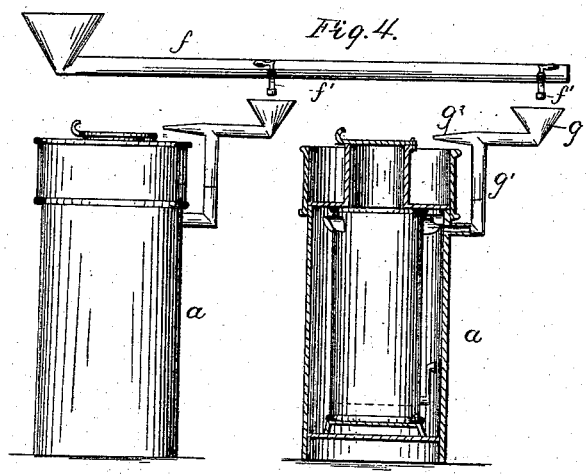
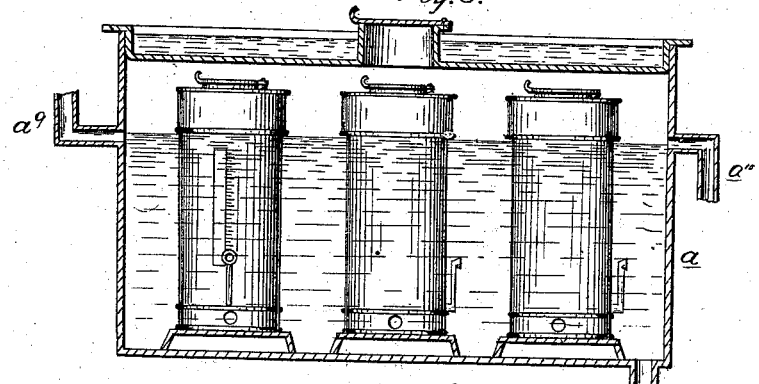
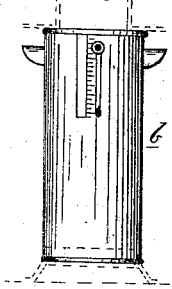
WITNESSES
P. B. Turpin
F. D. Thomason
INVENTOR
Edward Price
By R. S. & A. P. Lacey
ATTORNEYS.

UNITED STATES PATENT OFFICE.

EDWARD PRICE, OF POMEROY, IOWA.

MILK-COOLER.

SPECIFICATION forming part of Letters Patent No. 229,180, dated June 22, 1880.

Application filed July 16, 1879.

*To all whom it may concern:*

Be it known that I, EDWARD PRICE, of Pomeroy, in the county of Calhoun and State of Iowa, have invented certain new and useful Improvements in Milk-Coolers; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

This invention has for its object to furnish a device wherein the water can be kept running around the milk-can, and so that the heat of the milk will be rapidly removed and the escape-pipes kept sweet and clean.

This invention consists in two discharge-pipes, the one made funnel shape and placed within and the other placed outside of the milk-can, and both united, so that each may be adjusted independently of the other.

It consists, further, in a series of tanks for holding the milk-cans, a water-supply pipe provided with cocks, and a funnel of peculiar construction, all of which will be hereinafter explained, and more specifically pointed out in the claims.

In the drawings, Figure 1 is a vertical section of a tank with a milk-can set therein. Figs. 2 and 3 show detail views of the attachment for drawing off the milk and cream. Fig. 4 shows the manner of conveying the water to the tank. Fig. 5 is a large tank with a series of cans placed therein, and Fig. 6 is a milk-can detached from the other devices.

$a$ is a tank in which the milk can or cans $b$ are placed. It is provided with an open top covered by a lid, $a'$, which has a flange, $a^2$, that extends down on the outside of the tank, as shown, making a close and firm attachment. The lid is also formed so as to have a reservoir, $a^3$, on top to receive water.

$a^4$ is an opening in the lid, through which the animal heat of the milk escapes. $a^5$ is a tube or pipe surrounding the opening $a^4$, and having its upper end flush with the upper ledge or rim of the reservoir $a^3$, so that when the latter is filled with water none can flow over into the tube and down through the opening $a^4$ into the milk-can below. The tube $a^5$ has a cover, $a^6$, hinged so that it may be turned sidewise and partially or wholly open the upper end thereof, as may be desired.

Through the sides of the tank $a$, I make an inlet, $a^7$, and an outlet, $a^8$, which are arranged slightly below the level of the top of the can $b$, so that the water cannot be raised to run over the top of said can. The orifices or openings $a^7$ $a^8$ are provided with suitable pipes $a^9$ $a^{10}$, by which the series of tanks may be connected together when desired.

The bottom $c$ is arranged within and above the bottom rim, $c'$, of the tank, so as to provide a chamber, $c^2$, below it, having openings $c^3$ through the sides into it, which permits a free circulation of air, or when the tank is placed in a larger tank water will circulate through the said chamber. On the bottom $c$, within the tank, I fix a false elevated bottom, $c^4$, so arranged as to provide a passage, $c^5$, below it, through which the water can circulate. On this bottom $c^4$ the can $b$ is set.

The top of the can $b$ may be made flush with the upper ledge or rim of the tank $a$, so that the lid $a'$ will rest on it; or it may be made so that its top will be a little below the rim of the tank, thus providing an air-chamber above it, as shown in Fig. 5. The can $b$ is also provided with projecting handles $b'$, formed and arranged so that they can be turned under the lugs $o$ on the inner sides of the tank and secure the said can firmly in its position on the bottom $c^4$. The can $b$ has formed a suitable slot, $b^2$, in its side, in which is fixed a piece of glass or mica, $b^3$, and it has formed at the side of the slot a scale, $b^4$, which indicates the quantity of milk within.

Each can $b$ is provided with a device, $d$, for drawing off the milk or cream. This device is composed of an exterior tube, $d'$, made in the form of a crank, and an interior funnel-shaped tube, $d^2$. The exterior tube, $d'$, has its free end provided with a suitable cap or plug, $d^3$, which may be removed when the fluid is to be drawn from the can. The other end of the tube $d'$ is placed in a suitable opening in the side of the can, and is held by a nipple, $d^4$, and jam-nut $d^5$, so that it may be turned readily and as often as desired. Within the inner end of said tube $d'$, I form a female thread, $d^6$, which receives the threaded end $d^7$ of the inner tube, $d^2$, as shown.

The inner pipe, $d^2$, is made funnel-shaped, as shown, and has its lower smaller end bent to a suitable angle, so that its threaded end $d^7$ will readily screw into the end of the outer pipe, $d'$, as hereinbefore explained. The wide mouth and funnel shape of the pipe increases its suction-power, and it will draw off the surface cream or milk with greater rapidity and more perfectly than can be done by the ordinary straight pipes.

The pipe $d'$ $d^2$ is made in separate pieces, so as to more readily introduce it within its bearing. The part $d^2$ being introduced, as shown, the part $d'$ is screwed upon the same with ease. The inner pipe, $d^2$, may be set the desired angle.

When the inner tube, $d^2$, is to be attached its end $d^7$ is placed in the end $d^6$ of the outer tube, and the latter is turned like a crank, which movement unites the threads $d^6$ $d^7$ and draws the end of tube $d^2$ into tube $d'$, as shown in Fig. 2. The tube $d^2$ is detached by a reverse movement of the tube $d'$.

When the tube $d^2$ is detached the milk can all be drawn off, leaving the cream in the can.

The tube $d^2$ is usually made long enough to reach up to the top, or nearly to the top, of the can, so that when attached and the tube $d'$ is opened the cream can be drawn off from the milk.

In some of my cans I have two outer tubes, $d'$, one placed near the top and the other near the bottom; but it is not necessary to have two, as a long tube, $d^2$, can be employed, which will reach through the milk to the under side of the cream.

The tube $d^2$ can readily be attached when the can is full of milk.

On the outer side of the can I place a scale, $e$, curved to correspond with the arc described by the end of the crank-tube $d'$. This scale will indicate the point to which the milk is drawn off by the tube. It will be understood that the tube $d'$ may be turned to any angle between the vertical and horizontal, which movement causes the inner pipe, $d^2$, to assume a relatively inclined position, (unless prevented, as hereinafter explained,) so that the milk can all be drawn out of the can, or any given quantity, as indicated on the scale $e$.

When the milk or cream is to be drawn off in small quantities and at different times the open end of the inner pipe may be set at the desired depth, and the outer pipe, by being loosely turned onto the stem $d^7$, may be turned down to let the milk run out without interfering with the adjustment of the said inner pipe. When desired, the inner pipe may be entirely removed.

The tanks when used in series—one for each milk-can—are arranged one slightly below another, and are connected together by pipes, so that water entering the first will flow to the second, and to the third, and so on; but I prefer to have a long pipe, $f$, arranged above the tanks and provided with cocks $f'$, to let the water flow into each tank. I then provide a funnel, $g$, which has two discharge-pipes, $g'$ $g^2$. The pipe $g'$ conveys water into the reservoir $a^3$, and the pipe $g^2$ conveys the water into the tank $a$, as shown in Fig. 4.

In Fig. 5 I have shown a large tank having a reservoir-lid. In this tank I place a series of cans and surround them by water and fill the reservoir of the lid with water; but this construction is only desirable where the tanks are not to be frequently moved. In the ordinary farm-dairies it is more desirable to have a tank for each milk-can, for then they can be arranged any place most convenient to the water-supply, and when the milk is removed the cans and tanks can be removed to any suitable shelter or room.

The advantages of this device will be apparent to any person acquainted with the handling of milk.

What I claim as my invention is—

1. In a milk-can, the inner pipe, $d^2$ $d^7$, of funnel shape, combined with the outer pipe, $d'$ $d^6$, and capable of adjustment, as shown, and with the bearing in the tank, as and for the purpose set forth.

2. The combination of a series of tanks, $a$, having inlet-pipes $a^9$ and lids $a'$, reservoir $a^3$, the water-pipe $f$, having a series of cocks, $f'$, and the funnel or series of funnels $g$, provided with stems $g^2$ and pipe $g'$, substantially as and for the purposes set forth.

In testimony that I claim the foregoing as my own I affix my signature in presence of two witnesses.

EDWARD PRICE.

Witnesses:
E. J. PRICE,
R. C. STEWART.